United States Patent
Asakura et al.

(10) Patent No.: US 8,297,999 B2
(45) Date of Patent: Oct. 30, 2012

(54) CONNECTOR STRUCTURE OF ELECTRICAL EQUIPMENT AND VEHICLE

(75) Inventors: Ken Asakura, Toyota (JP); Shuichi Iwata, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 240 days.

(21) Appl. No.: 12/663,992

(22) PCT Filed: Jun. 4, 2008

(86) PCT No.: PCT/JP2008/060632
§ 371 (c)(1),
(2), (4) Date: Dec. 10, 2009

(87) PCT Pub. No.: WO2008/153033
PCT Pub. Date: Dec. 18, 2008

(65) Prior Publication Data
US 2010/0184322 A1   Jul. 22, 2010

(30) Foreign Application Priority Data

Jun. 12, 2007   (JP) .................................. 2007-155446

(51) Int. Cl.
*H01R 13/64* (2006.01)
(52) U.S. Cl. ........................................ 439/372; 439/189
(58) Field of Classification Search .................. 439/374, 439/372, 189, 157, 928.1
See application file for complete search history.

(56) References Cited

U.S. PATENT DOCUMENTS

| | | | | |
|---|---|---|---|---|
| 5,619,397 A | * | 4/1997 | Honda et al. | 361/679.43 |
| RE35,915 E | * | 10/1998 | Hastings et al. | 439/377 |
| 5,924,880 A | | 7/1999 | Watanabe et al. | |
| 6,471,527 B2 | | 10/2002 | Fukamachi et al. | |
| 6,926,545 B2 | * | 8/2005 | Fukamachi et al. | 439/157 |
| 7,241,154 B1 | * | 7/2007 | Mauney et al. | 439/157 |
| 7,396,240 B2 | * | 7/2008 | Frederiksen et al. | 439/157 |
| 2002/0019156 A1 | * | 2/2002 | Fukamachi et al. | 439/157 |

FOREIGN PATENT DOCUMENTS

| | | |
|---|---|---|
| JP | 11-003746 A | 1/1999 |
| JP | 2002-056934 A | 2/2002 |
| JP | 2002-203642 A | 7/2002 |
| JP | 2004-288442 A | 10/2004 |
| JP | 2005-251569 A | 9/2005 |
| JP | 2006-141144 A | 6/2006 |

OTHER PUBLICATIONS

Notice of Allowance dated Feb. 1, 2011, in corresponding Japanese Patent Application No. 2007-155446.

* cited by examiner

*Primary Examiner* — Tulsidas C Patel
*Assistant Examiner* — Travis Chambers
(74) *Attorney, Agent, or Firm* — Sughrue Mion, PLLC

(57) ABSTRACT

A connector structure of electrical equipment is for electrically connecting a PCU with a wire, including a waterproof cover having a projection formed at a position adjacent to a recess, a connector provided on a bottom surface of the recess and electrically connected to a control board provided in a casing, and a connector to be fitted to connector from outside of the casing. Connector is formed to include a fitting member to be fitted in connector, and a turn lever, pivotally supported to be rotatable about the fitting member and having a projection to be aligned with the projection when the fitting member is correctly fit in the connector.

7 Claims, 4 Drawing Sheets

CONNECTOR STRUCTURE OF ELECTRICAL EQUIPMENT AND VEHICLE

CROSS REFERENCE TO RELATED APPLICATIONS

This application is a National Stage of International Application No. PCT/JP2008/060632, filed Jun. 4, 2008, which claims priority from Japanese Patent Application No. 2007-155446, filed Jun. 12, 2007, the contents of all of which are incorporated herein by reference in their entirety.

TECHNICAL FIELD

The present invention relates to a connector structure of electrical equipment and to a vehicle and, more specifically, to a connector structure for electrically connecting electrical equipment to a wire, as well as to a vehicle provided with the structure.

BACKGROUND ART

Examples of conventional connector structures in which a connector is connected to a side surface of a box are described, for example, in Japanese Patent Laying-Open Nos. 2006-141144 (Patent Document 1) and 2002-56934 (Patent Document 2).

Japanese Patent Laying-Open No. 2006-141144 (Patent Document 1) describes that a connector is fitted in a receptacle provided on a side surface of a case.

Japanese Patent Laying-Open No. 2002-56934 (Patent Document 2) describes a connector having a cover and a lever pivotally supported to the cover. Here, as the lever is turned from a start position to an end position, the connector is correctly fitted. On the lever and on the cover, ribs are formed as markers. When the lever is turned to the end position, ribs are aligned one above the other and, by visually confirming the alignment, it is possible to make sure that turning of the lever has correctly finished.

When the connector is inserted to a recess provided on a side surface of a box as described in Patent Document 1, it may be sometimes difficult to visually confirm the fitting state of connector. This may result in lower work efficiency at the step of connecting a wire to electrical equipment.

The technique of Patent Document 2 is said to enable simple and reliable determination as to whether the connector is correctly fitted. The connector structure described in Patent Document 2, however, is not the one in which the connector is inserted to a recess provided on a side surface of a box. When a connector is inserted to a bottom surface of a recess provided on a side surface of a box, it is not always possible to determine whether the connector is correctly fitted or not in a simple and reliable manner by visual confirmation.

DISCLOSURE OF THE INVENTION

An object of the present invention is to provide a connector structure for electrical equipment allowing simple and reliable determination as to whether a connector is correctly fitted or not by visual confirmation, when a connector is inserted to a recess provided on a side surface of a box, and to provide a vehicle provided with such a structure.

The present invention provides a connector structure of electrical equipment for electrically connecting electrical equipment with a wire, including: a box having a side surface, a recess formed on the side surface, and a projection formed on the side surface at a position adjacent to the recess; an electric component implementing the electrical equipment housed in the box; a first connector provided at a bottom surface of the recess and electrically connected to the electric component; and a second connector fitted to the first connector from outside of the box. The second connector includes a first member to be fitted to the first connector, and a second member having a portion to be aligned with the projection when the first member is correctly fit in the first connector.

In the structure described above, by visually inspecting whether the projecting portion of the box and the portion to be aligned with the projecting portion of the second connector are aligned, it is possible to confirm whether the first and second connectors are correctly fitted. Therefore, it is possible to determine whether or not the first and second connectors are correctly fitted in a simple and reliable manner.

In the present specification, "correctly fitted" means that one connector is sufficiently pushed into the other connector and fitted to realize a prescribed electrically conducting state.

In the connector structure of electrical equipment described above, as an example, the second member is pivotally supported to be rotatable with respect to the first member.

In the connector structure of electrical equipment described above, preferably, the projection and the portion of the second member to be aligned with the projection are visually recognizable from above the box. Therefore, it is possible to determine whether or not the first and second connectors are correctly fitted, in a simple and reliable manner from above the box.

In the connector structure of electrical equipment described above, preferably, the box includes a casing with an opening and a recessed cover attached to the opening, and the recess is formed by the cover.

Further, in the connector structure of electrical equipment described above, preferably, the projection is formed integrally with the cover.

Further, in the connector structure of electrical equipment described above, preferably, the electrical equipment is a controller for controlling a rotating electric machine for driving a vehicle.

The vehicle in accordance with the present invention includes the connector structure of electrical equipment described above. Therefore, it is possible to determine whether or not a connector is correctly fitted, in a simple and reliable manner, when a wire is connected to electrical equipment mounted on the vehicle.

By the present invention, it is possible to determine the fitting state of a connector inserted to a recess provided at a side surface of a box in a simple and reliable manner by visual confirmation.

It is noted that two or more of the structures described above may be combined.

BEST MODE FOR CARRYING OUT THE INVENTION

Figure 1:
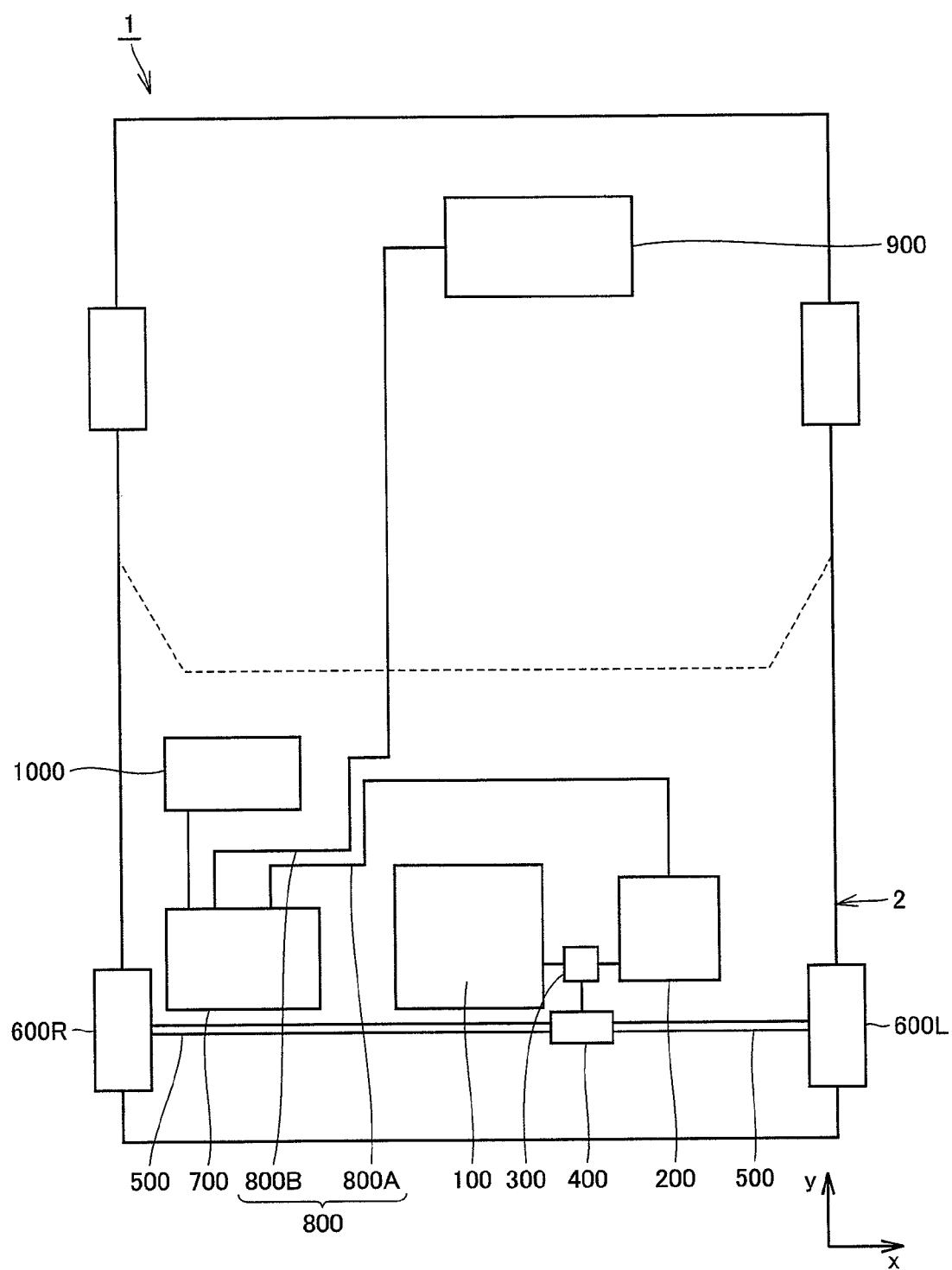
FIG. 1 is a schematic diagram showing a structure of a hybrid vehicle to which the connector structure of electrical equipment in accordance with an embodiment of the present invention is applied.

In the following, an embodiment of the present invention will be described. It is noted that the same or corresponding portions are denoted by the same reference characters, and description thereof may not be repeated.

In the embodiments described in the following, descriptions of numbers, amounts and the like are not intended to limit the scope of the invention unless otherwise specified. Further, in the embodiments below, each component is not always necessary, unless otherwise specified. When a plurality of embodiments are possible, it is naturally expected that structures of various embodiments are appropriately combined, unless otherwise specified.

FIG. 1 is a schematic diagram showing a structure of a hybrid vehicle having the connector structure of electrical equipment in accordance with an embodiment of the present invention.

Referring to FIG. 1, a hybrid vehicle 1 includes an engine 100, a motor generator 200, a power split device 300, a differential mechanism 400, a drive shaft 500, driving wheels 600L and 600R as front wheels, a PCU (Power Control Unit) 700, a cable 800, a battery 900, and an ECU (Electrical Control Unit) 1000.

As shown in FIG. 1, engine 100, motor generator 200, power split device 300, PCU 700 and ECU 1000 are arranged in an engine room 2. Motor generator 200 and PCU 700 are connected by a cable 800A. PCU 700 and battery 900 are connected by a cable 800B. Further, a power output device formed of engine 100 and motor generator 200 is coupled to differential mechanism 400 through power split device 300 and a reduction mechanism. Differential mechanism 400 is coupled to driving wheels 600L and 600R through drive shaft 500.

Motor generator 200 is a three-phase AC synchronous motor generator, which generates driving force from the AC electric power received from PCU 700. Further, motor generator 200 is also used as a generator when, for example, speed of hybrid vehicle 1 is reduced, generates AC power by the power generating function (regenerative power), and outputs the generated AC power to PCU 700. Power split device 300 includes a planetary gear, as will be described later.

PCU 700 controls driving of motor generator 200 by converting a DC voltage received from battery 900 to an AC voltage. Further, PCU 700 converts an AC voltage generated by motor generator 200 to a DC voltage and thereby charges battery 900.

To ECU 1000, pieces of information indicating traveling status/vehicle status from various sensors such as amount of accelerator stepping/stepping speed detected by a position sensor arranged for the accelerator pedal are input. The information indicating traveling status includes, in addition to the output of accelerator position sensor mentioned above, outputs from a wheel speed sensor, a vehicle body gradient sensor and the like. Further, as the vehicle status, outputs of a temperature sensor, a current sensor, a rotation speed sensor and the like of motor generator 200 indicating operating conditions of the motor, are input. Based on these pieces of information, ECU 1000 performs various control operations related to hybrid vehicle 1 in an integrated manner.

Figure 2:
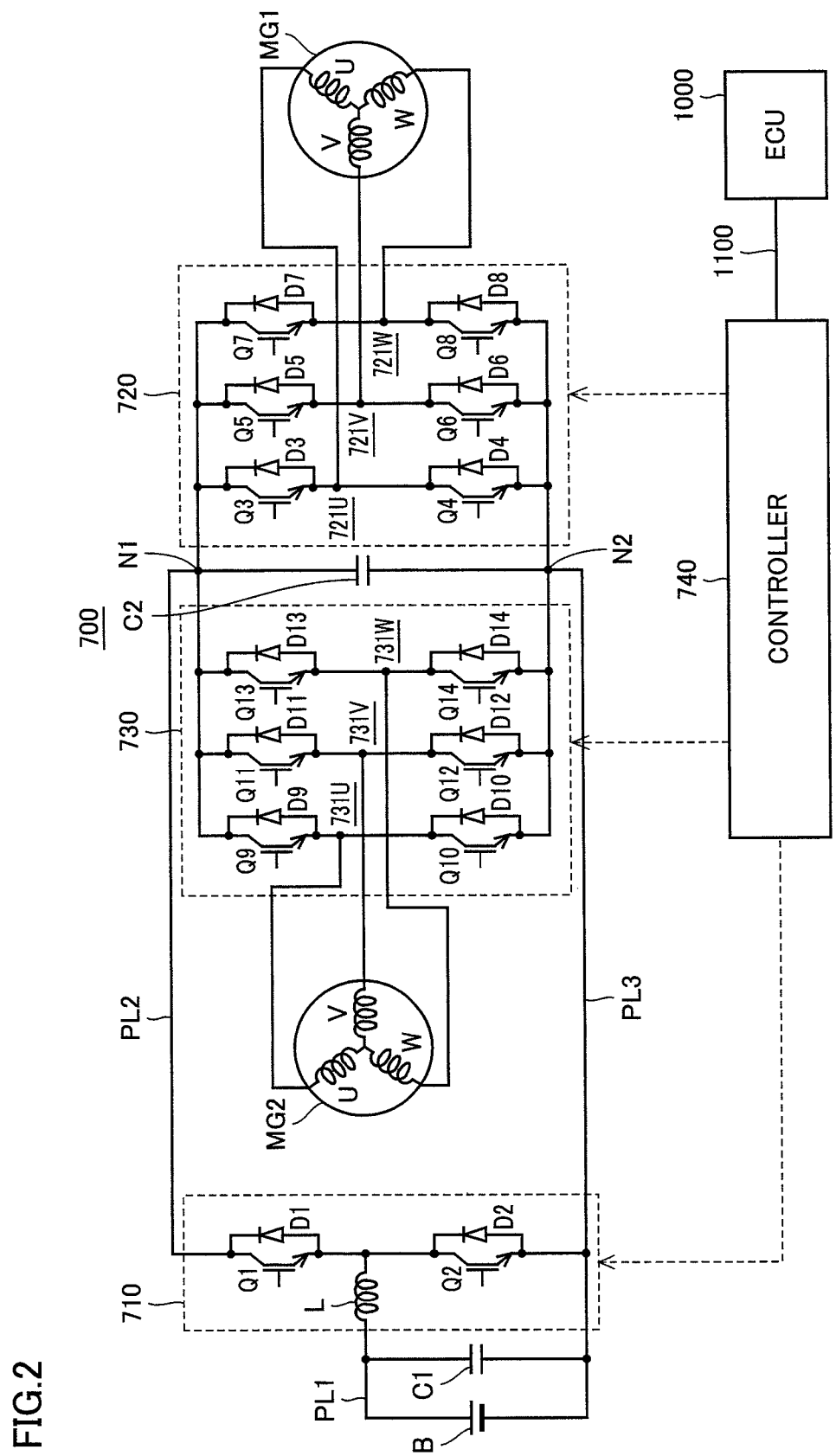
FIG. 2 is a circuit diagram showing a configuration of a main portion of a PCU shown in FIG. 1.

FIG. 2 is a circuit diagram showing a structure of a main portion of PCU 700. Referring to FIG. 2, PCU 700 is formed to include a converter 710, inverters 720 and 730, a controller 740, a filter capacitor C1 and a smoothing capacitor C2. Converter 710 is connected between battery B and inverters 720 and 730, and inverters 720 and 730 are connected to motor generators 200 (MG1 and MG2), respectively.

Converter 710 includes power transistors Q1 and Q2, diodes D1 and D2, and a reactor L. Power transistors Q1 and Q2 are connected in series, and each at its base, receive a control signal from controller 740. Diodes D1 and D2 are connected between collector and emitter of power transistors Q1 and Q2, respectively, to cause current flow from emitter side to collector side of power transistors Q1 and Q2, respectively. Reactor L has one end connected to a power line PL1 connected to a positive electrode of battery B, and the other end connected to a node between power transistors Q1 and Q2.

Converter 710 boosts DC voltage received from battery B using reactor L, and supplies the boosted voltage to a power line PL2. Further, converter 710 lowers the DC voltage received from inverter 720, 730, and with this voltage, charges battery B.

Inverters 720 and 730 include U-phase arms 721U and 731U, V-phase arms 721V and 731V, and W-phase arms 721W and 731W, respectively. U-phase arm 721U, V-phase arm 721V and W-phase arm 721W are connected in parallel between nodes N1 and N2. Similarly, U-phase arm 731U, V-phase arm 731V and W-phase arm 731W are connected in parallel between nodes N1 and N2.

U-phase arm 721U includes series-connected two power transistors Q3 and Q4. Similarly, U-phase arm 731U, V-phase arms 721V and 731V and W-phase arms 721W and 731W include series-connected two power transistors Q5 to Q14, respectively. Between collector and emitter of each of the power transistors Q3 to Q14, diodes D3 to D14, causing current flow from emitter side to collector side, are connected, respectively.

A middle point of the arm of each phase in inverters 720 and 730 is connected to an end of each phase of coils of respective phases in motor generators MG1 and MG2. Motor generators MG1 and MG2 are formed by three coils of U, V and W phases, each having one end connected commonly to a mid point.

Filter capacitor C1 is connected between power lines PL1 and PL3, and smoothes voltage level of power line PL1. Further, smoothing capacitor C2 is connected between power lines PL2 and PL3, and smoothes voltage level of power line PL2.

Inverters 720 and 730 convert a DC voltage from capacitor C2 to an AC voltage based on a drive signal from controller 740, and thereby drive motor generators MG1 and MG2.

To controller 740, ECU 1000 is connected through wire 1100. Controller 740 calculates coil voltages of respective phases of motor generators MG1 and MG2, based on a motor torque command value from ECU 1000, phase current values of motor generators MG1 and MG2, and input voltages of inverters 720 and 730, and based on the result of calculation, generates and outputs to inverters 720 and 730 a PWM (Pulse Width Modulation) signal for turning on/off power transistors Q3 to Q14.

Further, controller 740 calculates duty ratio of power transistors Q1 and Q2 for optimizing input voltages to inverters 720 and 730 based on the motor torque command value and motor rotation number mentioned above, and based on the result of calculation, generates and outputs to converter 710 a PWM signal for turning on/off power transistors Q1 and Q2.

Further, controller 740 controls switching operations of power transistors Q1 to Q4 of converter 710 and inverters 720 and 730, in order to convert the AC power generated by motor generators MG1 and MG2 to DC power and thereby to charge battery B.

Next, referring to FIGS. 3 to 5, the connector structure in accordance with the present embodiment will be described. The connector structure in accordance with the present embodiment is for electrically connecting ECU 1000 and controller 740 described above through wire 1100.

Figure 3:
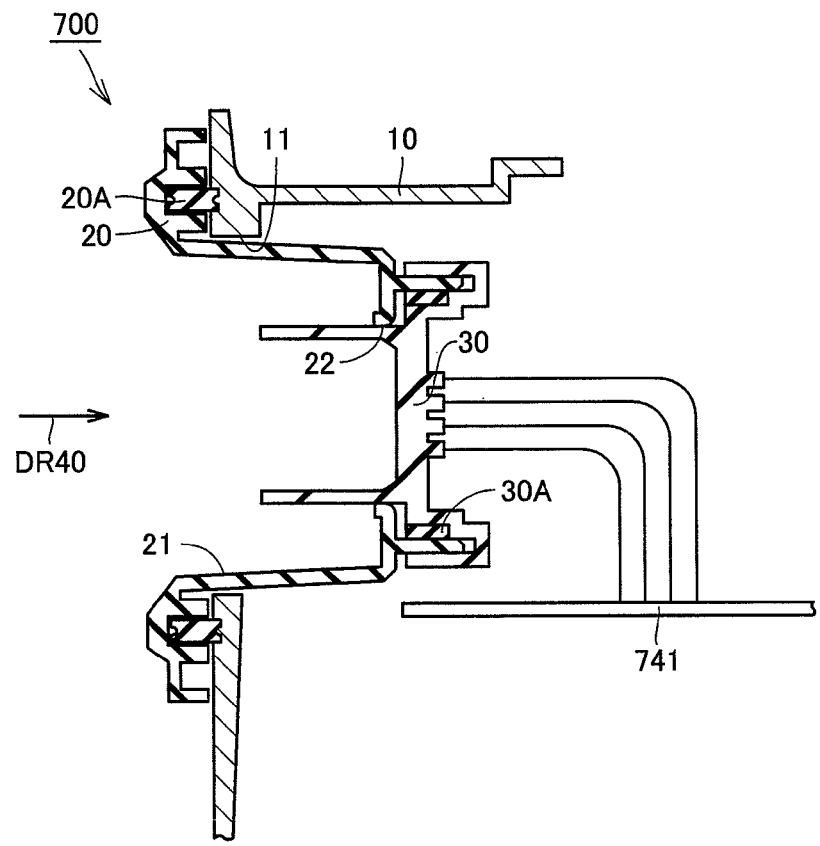
FIG. 3 is a cross-sectional side view showing a connector structure of electrical equipment in accordance with an embodiment of the present invention.

Referring to FIG. 3, an electric device (including a control board 741 forming controller 740) implementing PCU 700 is provided in a casing 10. Casing 10 has an opening 11 on its side surface. A waterproof cover 20 having a recess 21 is attached to opening 11. Between a flange portion of waterproof cover 20 and outer surface of casing 10, a seal member 20A (O ring) is provided. By casing 11 and waterproof cover 20, a "box" having a recess 21 on its side surface is formed. Waterproof cover 20 has an opening 22 at the bottom of recess 21. A connector 30 is attached to opening 22. Between waterproof cover 20 and connector 30, a seal member 30A (O ring) is provided.

Connector 30 is electrically connected to control board 741 forming controller 740 of PCU 700. Therefore, when another connector connected to ECU 1000 is connected to connector 30, electrical connection is established between ECU 1000 and control board 741, whereby control current from ECU 1000 is supplied to controller 740. In the present embodiment, a connector 40 is connected to connector 30 from a direction of an arrow DR40.

Figure 4:
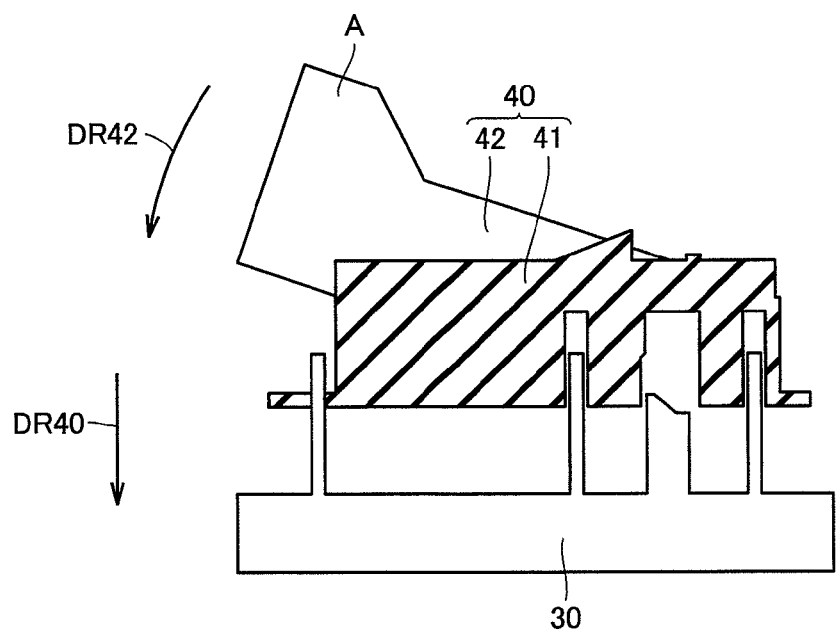
FIG. 4 is a (first) illustration showing a step of fitting of the connector structure of electrical equipment in accordance with an embodiment of the present invention.

Referring to FIG. 4, connector 40 is formed to include a fitting member 41 that fits in connector 30, and a turn lever 42 pivotally supported to rotate in a direction of an arrow DR42 with respect to fitting member 41. A projection A is provided at a tip end portion of turn lever 42.

When ECU 1000 and PCU 700 (controller 740) are to be actually connected electrically, first, connector 30 is set in a prescribed state as shown in FIG. 3, and in this state, fitting member 41 is tentatively fitted in connector 30. When fitting member 41 is tentatively fitted in connector 30, it becomes possible to rotate turn lever 42 to fitting member 41 in the direction of arrow DR42. When turn lever 42 is turned and pressed to the direction of arrow DR42 with fitting member 41 tentatively fitted in connector 30, connector 40 is pushed to connector 30 in the direction of arrow DR40.

Figure 5:
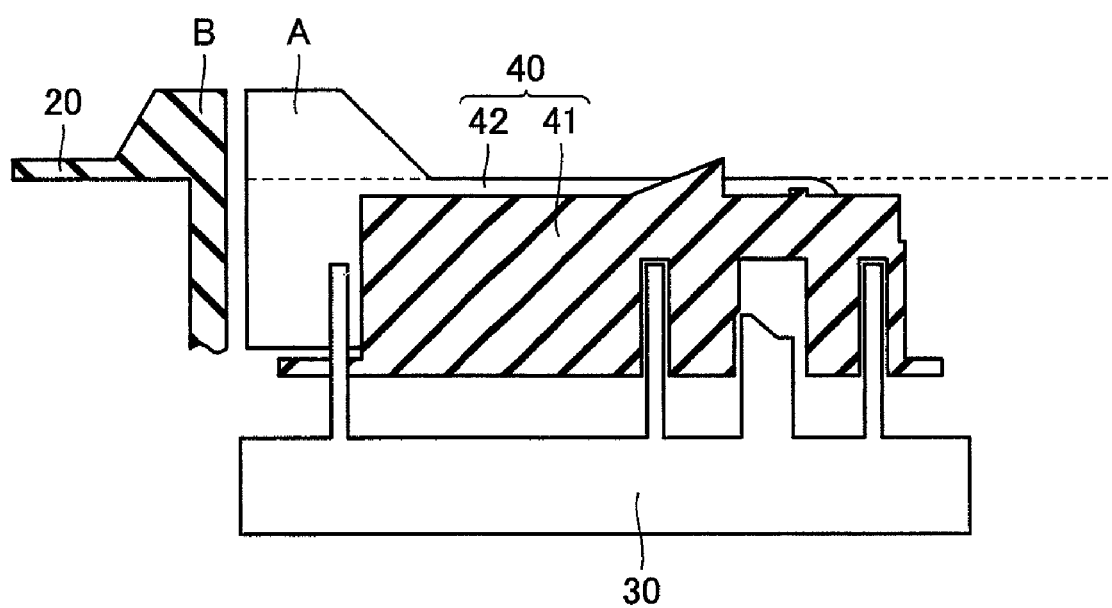
FIG. 5 is a (second) illustration showing a step of fitting of the connector structure of electrical equipment in accordance with an embodiment of the present invention.

FIG. 5 shows a state in which turn lever 42 is rotated to the end position and connectors 30 and 40 are correctly fitted. As shown in FIG. 5, a projection B is provided at a portion adjacent to recess 21, of waterproof cover 20. Waterproof cover 20 is formed, for example, by an insulator such as a resin. In the example shown in FIG. 5, projection B is formed integrally with waterproof cover 20.

As shown in FIG. 5, projections A and B are formed such that a tip end of projection A is aligned with a tip end of projection B when turn lever 42 is rotated to the end position. Referring to FIG. 5, portions upper than the dotted line are positioned outside of recess 21 in a region easily visible from above casing 10. Therefore, the state of alignment of projections A and B can be visually confirmed from above casing 10.

As shown in FIG. 3, connector 30 is provided deep inside the recess 21 and, therefore, when connector 40 is inserted to connector 30, is it difficult to determine whether connectors 30 and 40 are correctly fitted. According to the present embodiment, however, by providing projections A and B on turn lever 42 of connector 40 and waterproof cover 20 such that projections A and B are aligned when connectors 30 and 40 are in correctly fitted state, it becomes possible to easily and reliably confirm, by visual inspection, the state of fitting between connectors 30 and 40 from above casing 10. As a result, correct and speedy connection of connectors 30 and 40 becomes possible.

In the example shown in FIG. 5, the state in which projections A and B project by the same amount is referred to as "alignment of projections A and B." The manner of "alignment of projections A and B," however, is not limited to the example shown in FIG. 5. By way of example, even when there is a step between projections A and B, if an operator visually confirms that the step is small enough to determine that turn lever 42 has rotated to the end position, such a state is also regarded as attaining the "alignment of projections A and B."

The contents described above will be summarized. Specifically, the connector structure for electrical equipment in accordance with the present embodiment is a connector structure for electrically connecting PCU 700 as the "electrical equipment" with wire 1100, including: casing 10 and waterproof cover 20 as the "box" having recess 21 formed on a side surface and projection B formed at a position adjacent to recess 21; control board 741 as the "electric component" housed in casing 10 with waterproof cover 20 attached, implementing PCU 700; connector 30 as the "first connector" provided at the bottom surface of recess 21 and electrically connected to control board 741; and connector 40 as the "second connector" fitted to connector 30 from the outside of casing 10. Recess 21 is formed by forming opening 11 on the side surface of casing 10 and by attaching waterproof cover 20 formed to have a recessed shape, to opening 11. Connector 40 is formed to include fitting member 41 as the "first member" to be fitted in connector 30, and turn lever 42 as the "second member" pivotally supported to rotate in the direction of arrow DR42 with respect to fitting member 41 and having projection A to be aligned with projection B in a state in which fitting member 41 is correctly fit in connector 30.

Though an example in which the second member (turn lever 42) is pivotally supported to be rotatable about the first member (fitting member 41) has been described in the embodiment above, the second member may be supported to be slidable forward/backward in the direction of inserting the connector with respect to the first member.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is applicable, for example, to a connector structure for electrically connecting electrical equipment to a wire and to a vehicle provided with such a structure.

The invention claimed is:

1. A connector structure of electrical equipment for electrically connecting electrical equipment with a wire, comprising:
 a box having a side surface, a recess formed on said side surface, and a projection formed on said side surface at a position adjacent to said recess;
 an electric component implementing said electrical equipment housed in said box;
 a first connector provided at a bottom surface of said recess and electrically connected to said electric component; and
 a second connector fitted to said first connector from outside of said box; wherein
 said second connector includes a first member to be fitted to said first connector, and a second member having a portion to be aligned with said projection when said first member is correctly fit in said first connector;

said projection and said portion of said second member to be aligned with said projection are visually recognizable from above said box; and only said portion of said second member to be aligned with said projection protrudes to the outside of said recess when said first member is correctly fit in said first connector.

2. The connector structure of electrical equipment according to claim 1, wherein said second member is pivotally supported to be rotatable with respect to said first member.

3. The connector structure of electrical equipment according to claim 1, wherein said electrical equipment is a controller for controlling a rotating electric machine for driving a vehicle.

4. A vehicle, comprising the connector structure of electrical equipment according to claim 1.

5. The connector structure of electrical equipment according to claim 1, wherein:

said portion of said second member to be aligned with said projection is another projection located at a tip of said second member; and said tip of said second member is pivoted in a direction to approach said recess of said box to correctly fit said connectors together.

6. The connector structure of electrical equipment according to claim 1, wherein said box includes a casing with an opening and a recessed cover attached to said opening; and said recess is formed by said cover.

7. The connector structure of electrical equipment according to claim 6, wherein said projection is formed integrally with said cover.

* * * * *